UNITED STATES PATENT OFFICE.

JAMES H. BEARDSLEY, OF NEW YORK, N. Y.

IMPROVEMENT IN COMPOSITION FOR PAINTS.

Specification forming part of Letters Patent No. 21,810, dated October 19, 1858.

*To all whom it may concern:*

Be it known that I, JAMES H. BEARDSLEY, of the city, county, and State of New York, have discovered or invented a new and useful Composition of Matter to be used as a Paint, of which the following is a specification.

Many attempts have been made prior to my invention to produce a paint which would have all the good qualities of, and answer as a substitute for, white-lead and oil paints without the deleterious properties of white lead, and which at the same time could be produced at less cost; and although in the numerous efforts some paints have been produced which could be used for some purposes, in so far as I am informed no one succeeded in producing a composition which possessed the required properties of body, durability, consistency, and surface when applied which white-lead and oil paints are known to possess. My object was the same with those who have preceded me; but by my invention I am enabled to produce paints which can be used as a white paint, and which can be readily mixed with any of the known pigments to produce any desired color; and although my said composition has none of the deleterious qualities of white-lead paints and can be produced at a greatly-reduced price, paints thus produced present all the good properties in an equal and some in a superior degree to white-lead paints.

To enable any one skilled in the art of preparing paints to practice my invention, I will give a full and detailed description of the composition and of the manner of preparing and using the same as I have practiced it.

To produce a white paint, I slake forty-six pounds of lime in ten gallons of water in a closed vessel to exclude air. I prefer the lime known as "Glenn's Falls lime," as I avoid using lime which is very caustic. When the lime is slaked, which will be in about two hours and a half, I remove the cover and add and thoroughly mix therewith seven pounds of bleached or fair brown sugar, preferring the former. After this I add and mix one quart of the best New Orleans molasses, which should be previously boiled for ten or fifteen minutes, and this should be added while at or near the boiling-point. I next add and stir in fifteen pounds of whiting and five pounds of dry oxide of zinc, both in fine powder. If it be desired to produce a very rich white, the quantity of zinc should be increased; and, lastly, I add three quarts of salt and ten ounces of refined borax, and when well stirred to incorporate all the ingredients the whole is allowed to stand over night and then run through an ordinary paint-mill. The composition then only requires to be reduced to the proper consistency with water to be used with the brush.

To produce cream-colored paint, twelve ounces of yellow ocher is added and incorporated with the white-paint composition. To produce yellow paint, I prefer to vary the proportion of the ingredients slightly, the process of manufacture remaining unchanged. To forty-eight pounds of lime are added eight pounds brown sugar, one quart of molasses, eight pounds whiting, two pounds dry oxide of zinc, both in fine powder, fourteen pounds French ocher mixed with water, three quarts of salt, and eight ounces of borax. To produce Venetian-red paint, I prefer to use the same proportions as for yellow paint, with the exception that in place of the French ocher nine pounds of Venetian red is added. By increasing the quantity of Venetian red and decreasing the quantity of whiting a brighter red is obtained. English vermillion is used in proportion as French ocher is used in yellow paint for vermillion-red paint; ultramarine-blue in the same way for blue paint.

From the description above given it will readily be understood that by employing different pigments paints of any desired tint may be prepared, and it is only necessary to remark that for bright colors the proportion of whiting and zinc should be considerably reduced and the quantity of the pigment employed for coloring should be augmented in a corresponding degree; but the oxide of zinc is an essential constituent of my paint.

When required for use the paints are reduced to a proper consistency by the addition of water. If work coated with paint prepared according to this discovery is to be varnished, I prefer to employ a varnish prepared in the following manner: To one gallon of linseed-oil I add one quart of spirits turpentine and one pound of white rosin, the mixture is allowed to stand until the rosin is entirely dissolved, and the varnish is then ready for use. In order to improve the finish of the work, it is in some cases desirable to mix this varnish with the last coat of paint. One pound of varnish to ten pounds of paint is a suitable proportion. The paint for the last coat should be very thin.

Paints prepared according to my said invention may be preserved ready for use for a great length of time if properly put up in close vessels, requiring simply to be reduced to the proper consistency with water when desired to be used with the brush. And it will be found that when prepared for use it will keep from day to day quite as well, if not better, than the best white-lead paints ground in oil.

What I claim as my invention, and desire to secure by Letters Patent, is—

The composition of matter, substantially such as above described, to be used alone as a white paint or in admixture with pigments for colored paints, as set forth.

New York city, September 6, 1858.

JAMES H. BEARDSLEY.

Witnesses:
W. A. NICHOLLS,
ELIAS WATSON.